US011570122B2

(12) United States Patent
Isaacs

(10) Patent No.: US 11,570,122 B2
(45) Date of Patent: *Jan. 31, 2023

(54) ORCHESTRATION IN A MULTI-LAYER NETWORK

(71) Applicant: salesforce.com, inc., San Francisco, CA (US)

(72) Inventor: Charles Hart Isaacs, Annapolis, MD (US)

(73) Assignee: salesforce.com, inc., San Francisco, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/927,941

(22) Filed: Jul. 13, 2020

(65) Prior Publication Data

US 2020/0344176 A1 Oct. 29, 2020

Related U.S. Application Data

(63) Continuation of application No. 15/885,519, filed on Jan. 31, 2018, now Pat. No. 10,715,459.

(Continued)

(51) Int. Cl.
*G06F 15/16* (2006.01)
*H04L 47/70* (2022.01)
(Continued)

(52) U.S. Cl.
CPC .......... *H04L 47/70* (2013.01); *G06F 16/2358* (2019.01); *G06F 16/27* (2019.01);
(Continued)

(58) Field of Classification Search
CPC ........ H04L 47/70; H04L 41/22; H04L 67/02; H04L 61/103; H04L 1/22; G06F 16/27; G06F 16/2358; G06F 16/7358
(Continued)

(56) References Cited

U.S. PATENT DOCUMENTS 5,754,857 A 5/1998 Gadol
6,112,225 A 8/2000 Kraft et al.
(Continued)

FOREIGN PATENT DOCUMENTS

AU 2010202541 A1 * 1/2011 .......... G07F 17/3211

OTHER PUBLICATIONS

Office Action in Canadian Appl. No. 3021361 dated Feb. 25, 2019, 4 pages.
(Continued)

*Primary Examiner* — Khanh Q Dinh
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to creating and managing an information flow within a multi-layer computer network. In various embodiments, a computer system in a first layer within a multi-layer computer network, maintains state information defining an information flow within the multi-layer computer network. In various embodiments, the computer system assigns a particular action (that is included in the information flow) to be performed at a second, different layer of the multi-layer computer network. In various embodiments, the computer system generates program instructions to perform the particular action. The program instructions may be generated using device information accessible to the computer system and indicative of characteristics of a computer system within the second layer. In various embodiments, the computer system in the first layer causes the program instructions to be sent to the computer system in the second layer to perform the particular action as part of the defined information flow.

19 Claims, 10 Drawing Sheets

Related U.S. Application Data

(60) Provisional application No. 62/578,122, filed on Oct. 27, 2017.

(51) Int. Cl.
*H04L 41/22* (2022.01)
*H04L 67/10* (2022.01)
*G06F 16/27* (2019.01)
*G06F 16/23* (2019.01)
*H04L 67/02* (2022.01)
*H04L 61/103* (2022.01)

(52) U.S. Cl.
CPC .............. *H04L 41/22* (2013.01); *H04L 67/02* (2013.01); *H04L 67/10* (2013.01); *H04L 61/103* (2013.01)

(58) Field of Classification Search
USPC ................... 709/220, 224, 226, 227, 228
See application file for complete search history.

(56) References Cited

U.S. PATENT DOCUMENTS

| | | | |
|---|---|---|---|
| 6,202,080 B1 | 3/2001 | Lu et al. | |
| 8,499,093 B2 | 7/2013 | Grosser et al. | |
| 9,225,609 B2* | 12/2015 | McNaughton | H04L 12/66 |
| 9,300,728 B1 | 3/2016 | Ananchaperumal | |
| 9,351,193 B2 | 5/2016 | Raleigh et al. | |
| 9,660,917 B2* | 5/2017 | McNaughton | H04L 63/102 |
| 9,832,090 B2* | 11/2017 | Bugenhagen | H04L 41/5035 |
| 10,715,459 B2* | 7/2020 | Isaacs | H04L 47/70 |
| 2003/0110010 A1* | 6/2003 | Kaneyama | G16H 30/40 702/183 |
| 2007/0150186 A1* | 6/2007 | Ingulsrud | G09B 29/106 701/431 |
| 2008/0263565 A1* | 10/2008 | Luther | G06F 16/2358 719/316 |
| 2011/0214650 A1 | 9/2011 | Wang et al. | |
| 2011/0283013 A1 | 11/2011 | Grosser et al. | |
| 2013/0067041 A1* | 3/2013 | Low | H04W 8/245 709/220 |
| 2013/0204815 A1 | 8/2013 | Grothmann et al. | |
| 2014/0372625 A1* | 12/2014 | Dureau | H04N 21/43635 709/231 |
| 2016/0241469 A1* | 8/2016 | Iizawa | H04L 45/64 |
| 2018/0048668 A1* | 2/2018 | Gupta | H04L 63/1425 |
| 2018/0062876 A1 | 3/2018 | Iizawa et al. | |
| 2018/0131831 A1* | 5/2018 | Tolia | G06Q 10/20 |
| 2019/0007277 A1* | 1/2019 | Misra | H04L 45/32 |
| 2019/0052477 A1* | 2/2019 | Dureau | H04N 21/43635 |
| 2019/0132254 A1* | 5/2019 | Isaacs | H04L 47/70 |
| 2019/0349409 A1* | 11/2019 | Lawson | H04L 9/0643 |
| 2020/0059976 A1 | 2/2020 | Bhatia et al. | |
| 2020/0274763 A1* | 8/2020 | Duda | H04L 41/024 |

OTHER PUBLICATIONS

Office Action in Canadian Appl. No. 3021361 dated Jun. 28, 2019, 5 pages.

* cited by examiner

User Interface 200

Normal

| IF | | THEN | | |
|---|---|---|---|---|
| When ▶ | Condition ○ | Actions (evaluated in order) | Transition | System |
| *110C* | irregular_heartbeat_counter >= 3 | + Add an action | ○ Warning | *110B* |
| *User Setting 210A* | *User Setting 210B* | *User Setting 210C* | *User Setting 210D* | *User Setting 210E* |

Warning

| IF | | THEN | | |
|---|---|---|---|---|
| When ▶ | Condition ○ | Actions (evaluated in order) | Transition | System |
| Minute 2 | irregular_heartbeat_counter <= 10 | Reset irregular_heartbeat_counter  X <br> + Add an action | ○ Healthy | *110B* |
| *110C* | irregular_heartbeat_counter > 10 | Call Technician John Smith  X <br> + Add an action | ● Critical | *110B* |

Critical

| IF | | THEN | | |
|---|---|---|---|---|
| When ▶ | Condition ○ | Actions (evaluated in order) | Transition | System |
| *110C* | router.irregular_heartbeat = FALSE | Reset irregular_heartbeat_counter <br> + Add an action | ○ Healthy | *110A* |

*FIG. 2*

ORCHESTRATION IN A MULTI-LAYER NETWORK

The present application is a continuation of U.S. application Ser. No. 15/885,519, filed Jan. 31, 2018 (now U.S. Pat. No. 10,715,459), which claims priority to U.S. Provisional Appl. No. 62/578,122, filed Oct. 27, 2017; the disclosures of which are incorporated by reference herein in their entirety.

BACKGROUND

Technical Field

This disclosure relates generally to creating and managing information flows and, more specifically, to distributing components of an information flow to computer systems in a multi-layer computer network.

Description of the Related Art

In the advent of the digital age, companies have begun to use cloud-based service platforms for hosting their applications. These service platforms are typically maintained by providers who make large upfront investments in computing infrastructure, including hardware. Providers then allow consumers to utilize as many resources (e.g., computing power, database storage, etc.) as they need for a nominal fee. Accordingly, consumers can purchase the right type and size of computing resources without having to pay for the resources that they do not consume.

In addition to cloud-based service platforms, there has also been a push to connect a wide variety of devices to the Internet so that they can communicate with each other—this concept is often called the "Internet of Things." For example, physical devices such as refrigerators, washers, thermostats, etc. may be embedded with electronic systems that allow consumers to communicate with these devices through the Internet. In order to provide consumers with relevant information about their devices, applications hosted on a cloud-based service platform can process data received from these devices. As additional devices are connected to the Internet, the amount of bandwidth consumed to deliver data between the devices and the applications running in the cloud-based platforms increases, leading to unwanted effects (e.g., costs, hardware stress, etc.).

BRIEF DESCRIPTION OF THE DRAWINGS

FIG. 2 is a block diagram illustrating example elements of a user interface that is usable to define an information flow, according to some embodiments.

Figure 1:
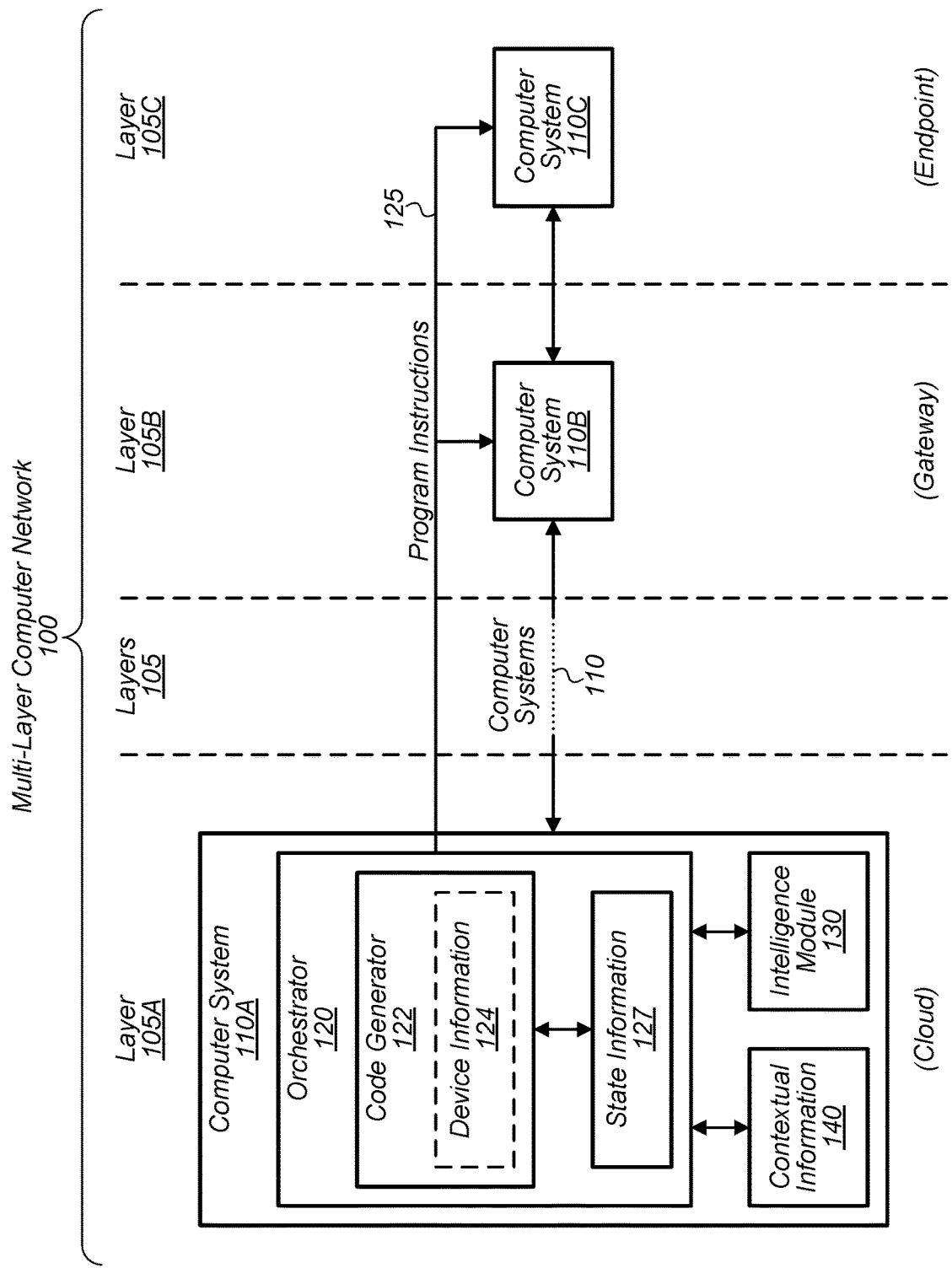
FIG. 1 is a block diagram illustrating example elements of a multi-layer computer network that facilitates the implementation of an information flow, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processor configured to execute an instance of a debugger application" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having four threads, the terms "first" and "second" threads can be used to refer to any two of the four threads.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes various techniques for creating and managing an information flow within a multi-layer computer network. As used herein, the term "information flow" refers to data that specifies a combination of states, rules, actions, and/or transitions that, when implemented, carryout some desired functionality. A state machine in which actions are performed based on the states of a computer system is one example of an information flow. The term "orchestration" may alternatively be used in place of the term "information flow." In various embodiments described below, portions of an information flow are distributed to various computer systems within a multi-layer computer network. In one implementation, for example, a computer system, residing within a first layer of a multi-layer computer network, maintains state information that defines an information flow between computer systems within that network. In such an implementation, the computer system in the first layer assigns actions of the information flow to be performed by a second computer system residing within another, different layer of the computer network. After assigning particular actions to the second computer system, the computer system residing in the first layer may generate program instructions that are executable by the second computer system to perform the particular actions. The computer system in the first layer may use information about the second computer system in order to determine in what manner the program instructions are to be generated. Once the instructions have been generated, in such an implementation, the computer system in the first layer may cause the program instructions to be sent to the second computer system so that the second computer system may perform the particular actions assigned to it as part of the information flow.

These techniques may be advantageous over prior approaches as they may allow the workload of an information flow to be distributed across multiple systems. Moreover, the bandwidth cost of sending data from an endpoint system (e.g., an Internet of Things device) across multiple systems (e.g., gateway systems) to a central system (e.g., a cloud-based platform) for processing may be vastly reduced as one or more of the multiple systems may perform some of the processing instead of the central system. Various embodiments of a system for implementing these techniques will now be described in more detail below, starting with FIG. 1.

Turning now to FIG. 1, a block diagram of a multi-layer computer network is shown. In the illustrated embodiment, a multi-layer computer network 100 includes multiple, different layers 105 in which computer systems 110 reside. As shown, layer 105A includes a computer system 110A having an orchestrator 120, an intelligence module 130, and contextual information 140. As further shown, orchestrator 120 includes a code generator 122 and state information 127. Layers 105B and 105C are also depicted as having respective computer systems 110B and 110C. In some embodiments, additional layers 105 are included between layers 105A-C—e.g., layers 105 shown between layer 105A and 105B in network 100. In some embodiments, network 100 may be implemented differently than shown. For example, device information 124 and/or contextual information 140 may be stored in a location external to system 110A.

Multi-layer computer network 100, in various embodiments, is a group of interconnected computer systems 110 that are organized into layers 105. The term "layers," as used in this disclosure, refers to distinct portions of the network, each of which may be separated physically by a communication mechanism (e.g., a wide-area network) and each of which may have a different role within the network. As an example, network 100 may include a set of computer systems 110 that represent a data center in the cloud (e.g., a first layer 105A), a set of computer systems 110 that represent a gateway (e.g., a second layer 105B), and a set of computer systems 110 that represent an endpoint system such as an Internet of things (IoT) device (e.g., a third layer 105C). Consider an example in which a thermometer device provides temperature readings, a router routes traffic from the thermometer device to other systems, and a database server processes those readings. Each one of these systems is physically separated from the others within network 100 and thus may be considered to reside in different layers 105 within that network 100. Layers 105 may be modular such that a given layer 105 may be disconnected from other layers 105 and still operate autonomously while gathering data or waiting for data. In various embodiments, layers 105 are connected via a communication mechanism. For example, a Wi-Fi network connection or a Bluetooth connection may connect a given layer 105 to another layer 105. Note that the term "layer," is not being used, for example, to refer to different portions of a network model such as the Open Systems Interconnection (OSI) model (e.g., a transport layer or physical layer). Instead, the term "layer" is used broadly to refer to different computer systems within a distributed computer network.

Orchestrator 120, in various embodiments, is a set of software routines that are executable to facilitate the implementation of an orchestration. Orchestrator 120 may be implemented entirely in hardware or a combination of software and hardware. In some embodiments, orchestrator 120 generates and distributes program instructions 125 to systems 110B and 110C so that those systems perform particular actions defined in an orchestration. These actions may include, but are not limited to, shutting down a particular system 110, contacting a technician to fix that system 110, providing information (e.g., system information) to another system 110 within network 100, reading from a database, and writing to a database. In generating and distributing instructions 125, orchestrator 120 may facilitate the implementation of the orchestration. In various embodiments, orchestrator 120 maintains state information 127 from which it generates program instructions 125.

State information 127, in various embodiments, includes an orchestration defining actions to be performed based on the state of an object. Consider the example above with the thermometer device. In such an example, information 127 may define a series of actions to be performed based on the temperatures read by the thermometer device. For example, a database server system may receive the temperatures readings and determine that a technician should be called based on the readings exceeding a particular temperature. In some embodiments, state information 127 specifies a state machine. In some embodiments, information 127 includes an indication of which systems 110 within network 100 are responsible for performing certain actions defined by information 127. This indication may be received from a user associated with the orchestration or may be automatically determined by system 110A. As such, in some embodiments, orchestrator 120 uses this indication when generating program instructions 125 so that the responsible systems 110 receive instructions 125 for performing their assigned actions.

Code generator 122, in some embodiments, is a set of software routines that are executable to generate program instructions 125. Instructions 125 may be executable by systems 110 within network 100 (such as systems 110B and 110C) to perform actions defined by information 127. As such, in various embodiments, before generating program instructions 125, generator 122 retrieves state information 127 and device information 124. In some embodiments, device information 124 specifies various characteristics for systems 110 within network 100. Device information 124 may include any combination of software and hardware characteristics such as the processing capacity of a particular computer system, the memory capacity of that system, the operating system (OS) running on that system, the bandwidth between that system and other systems within network 100, etc. Device information 124 may be accessible to system 110A and may be stored at system 110A or a location external to system 110A. Based on state information 127 and/or device information 124, in some embodiments, generator 122 assigns systems 110 to particular actions that are to be performed by those systems.

In some embodiments, code generator 122 assigns systems 110 to particular actions based on assignments received from a user associated with system 110A. These assignments may be the indication discussed above that is included in state information 127. In some cases in which a user assignment is used, generator 122 may determine whether the assigned systems 110 are capable of carrying out their assigned actions. For example, generator 122 may determine whether system 110B has the processing capacity required to perform its assigned action. In some embodiments, if a particular system 110 cannot perform the assigned action or if that action would consume too many resources of that system such that its overall performance may crater, generator 122 notifies a user associated with the orchestration so that such an action may be assigned to another system 110 within network 100. In some cases in which a user assignment is not used, generator 122 may use device information 124 in conjunction with information received from intelligence module 130 to make an informed assignment of actions in an orchestration to systems 110 within network 100.

After assigning actions in an orchestration to systems 110 based on assignments received from users or assignments automatically generated, in various embodiments, code generator 122 generates program instructions 125 for each individual system 110 that has been assigned one or more actions. In some embodiments, generator 122 consults device information 124 to determine, for a given system 110, the OS running on that system, the appropriate programming language in which to generate instructions 125, etc. For example, generator 122 may determine that a particular system 110 is running WINDOWS and thus may compile program instructions 125 using libraries associated with WINDOWS. In various embodiments, generator 122 produces a kernel or a plugin that can operate on top of the local kernel of a particular system 110 so that that system 110 may perform its assigned actions. In various embodiments, after generating instructions 125 for each of the appropriate systems 110, orchestrator 120 may cause program instructions 125 to be sent to their respective systems 110. In various embodiments, orchestrator 120 directly sends instructions 125 to the appropriate systems 110 and then instructs those systems 110 to execute the received instructions 125. In other embodiments, orchestrator 120 instructs a user to install instructions 125 on the appropriate systems 110. In various embodiments, orchestrator 120 generates instructions 125 for system 110A as well and causes them to be executed by system 110A In various embodiments, after distributing instructions 125, system 110A receives a request from a user to update the orchestration corresponding to those instructions. In some embodiments, system 110A generates new program instructions 125 according to the updated orchestration and distributes them to the appropriate systems 110. In such embodiments, system 110A may instruct the appropriate systems 110 to execute the new instructions 125 instead of the previously provided ones. In some instances, updating the orchestration may cause a particular system 110 to no longer have a role in implementing the orchestration. Accordingly, in various embodiments, system 110A instructs systems 110 that are to no longer be implementing the orchestration to cease executing instructions 125 that were previously provided to them.

Intelligence module 130, in various embodiments, is a set of software routines executable to analyze systems 110 within network 100 and to assist in determining which systems 110 should be responsible for performing certain actions in the orchestration. One example of a module 130 is SALESFORCE EINSTEIN. In some embodiments, module 130 performs its analysis after instructions 125 have been distributed to systems 110. In various embodiments, module 130 may (periodically) receive system information from systems 110 that specifies the current utilization of resources associated with those system 110. The resources may include an average processing utilization, an average memory utilization, the amount of storage used, etc. In some embodiments, module 130 uses the system information to determine whether a particular system 110 is being underutilized or over utilized. In such embodiments, module 130 compares a resource utilization to a predefined threshold (e.g., is over 80% of the memory being used by the particular system 110). Based on the comparison between the resource utilization and the predefined threshold, in various embodiments, module 130 determines whether actions should be provided to or removed from the particular system 110. Consider an example in which system 110B initially receives one action to perform. In this example, module 130 may determine, based on system information received from system 110B, that system 110B is utilizing only 30% of its total processing capacity. Accordingly, module 130 may determine that system 110B can perform more actions in the orchestration. In various embodiments, module 130 provides a recommendation to code generator 122 or a user associated with the orchestration that a particular system 110 can process additional actions and that such actions should be provided to that system 110. In some instances, module 130 may determine that the amount of data being sent across network 100 is too high and that it can be reduced by moving additional actions to a particular system 110 such as system 110B. Accordingly, module 130 may make a recommendation to a user or generator 122.

Contextual information 140, in various embodiments, includes information about tenants, applications, and devices. For example, information 140 may include model numbers for devices, software versions, contact names, contact emails, service history, device identifiers, etc. In various embodiments, information 140 includes customer relationship management (CRM) data (e.g., customer and prospect contact information, accounts, leads, sales opportunities, etc.) for various businesses. In various embodiments, information 140 is accessible to systems 110 for performing actions defined in an orchestration. Consider an example in which an orchestration includes various actions that are to be performed based on the state of system 110C. In such an example, system 110B may be provided an action to contact a technician in response to a system failure of system 110C. Accordingly, if system 110B determines that system 110C has crashed because it is no longer sending a heartbeat, then system 110B may use information 140 to determine an email address that is usable to contact the technician associated with the action. In some embodiments, information 140 is provided (or at least a portion relevant to the actions assigned to a given system 110) with program instructions 125 to systems 110 such that those systems 110 do not need to retrieve that information from an external source. In other embodiments, information 140 is stored externally to a given system 110 such that it has to retrieve such information from the external source.

In one implementation, computer system 110A maintains state information 127 that defines a particular orchestration/information flow within network 100. In this implementation, computer system 110A may receive a request to implement the particular orchestration. Accordingly, system 110A may assign a set of actions defined by the orchestration to system 110B and another set of the actions to system 110C. After assigning the sets of actions to systems 110B and 110C, system 110A may generate program instructions 125 executable by systems 110B and 110C to perform their respectively assigned actions. Subsequently, system 110A may cause instructions 125 to be sent to systems 110B and 110C so that they may perform their respectively assigned actions as part of the defined orchestration. Such an implementation may be advantageous over prior approaches as it may reduce the amount of processing performed by a given computer system and may further reduce the amount of bandwidth used in transmitting data across the multi-layer computer network. For example, instead of system 110A performing all of the actions defined by an orchestration, portions of those actions may be distributed to systems 110B and 110C. That is, certain actions defined in an orchestration may be pushed to the edge of the network (e.g., pushed to systems closer to an endpoint system) so that data necessary to perform those actions does not need to be transmitted across the entire network.

As mentioned above, a user may decide which systems 110 are to receive certain actions in an orchestration. Accordingly, an example of a user interface for assigning actions to systems 110 will now be described with respect to FIG. 2.

Turning now to FIG. 2, a block diagram of a user interface 200 for defining state information 127 in one example orchestration is shown. In the illustrated embodiment, user interface 200 includes user settings 210A-E. In some embodiments, system 110A causes interface 200 to be presented to a user associated with the example orchestration. In various embodiments, user setting 210A-B allow a user to define rules that indicate when particular actions and transitions between states are to occur. As shown for example, a user may select system 110C and specify a condition such as irregular_hearbeat_counter >10. In various embodiments, user setting 210C defines a set of actions to be performed if the corresponding conditions are met. As shown, if more than 10 irregular heartbeats are received from system 110C, then a technician may be called. In various embodiments, user setting 210D defines the state to be transitioned to if the corresponding conditions are met. In various embodiments, user setting 210E defines the system 110 that is to monitor for the conditions and perform the corresponding actions. As shown, system 110B is associated with the condition and action noted above and thus may contact the technician when more than 10 irregular heartbeats are received from system 110C. In various embodiments, any of the systems 110 within network 100 (including system 110A) may be selected for a particular action and/or condition.

By using interface 200, a user may be able to define how the implementation of an orchestration is distributed across systems 110. In particular, a user may define which actions are assigned to which system 110. The particulars of an example orchestration will now be discussed with respect to FIG. 3.

Figure 3:
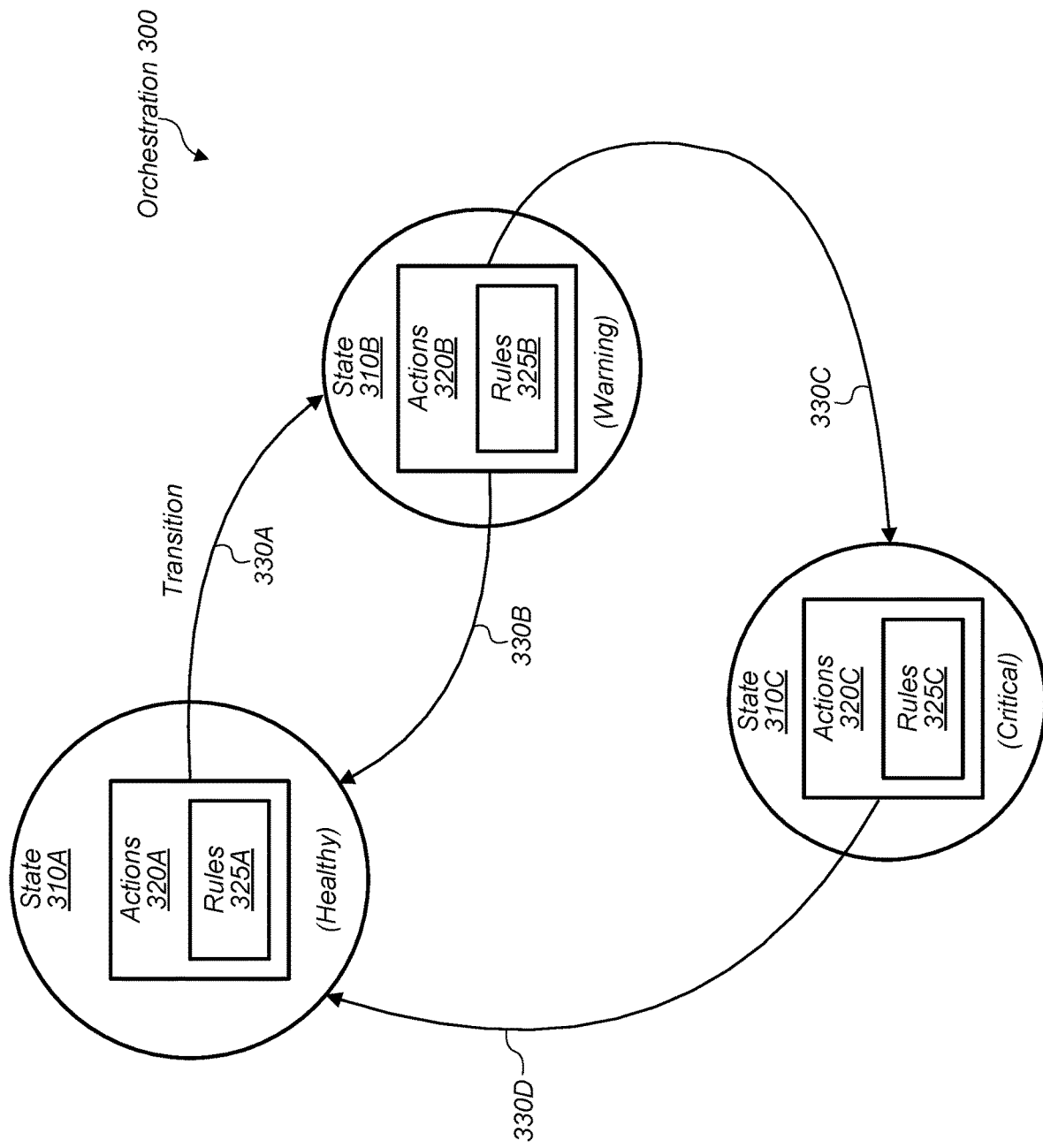
FIG. 3 is a block diagram illustrating example elements of an orchestration that defines an information flow, according to some embodiments.

Turning now to FIG. 3, a block diagram of an orchestration 300 is shown. In the illustrated embodiment, orchestration 300 is shown as a state machine and includes: states 310A-C that each have respective actions 320A-C; and transitions 330A-D representative of the possible movements between states 310A-C. Also as shown, actions 320A-C each have respective rules 325A-C. In various embodiments, orchestration 300 is implemented differently than shown—e.g., includes different states 310 and transitions 330.

States 310A-C, in various embodiments, represent statuses of a particular computer system 110 at a given point in time. For example, state 310A may indicate that a particular system 110 is operating as normal and thus is classified as healthy, state 310B may indicate that that particular system 110 has exhibited conditions that indicate it may not be operating properly, and state 310C may indicate that that particular system 110 is not operating properly (e.g., has crashed). In various embodiments, states 310A-C are each associated with respective rules 325A-C that define when a transition 330 occurs between those states. Rules 325A-C may further define when actions 320A-C are to be performed. Consider an example in which a particular orchestration 300 is created that has states 310A-C corresponding to a security system. In such an example, a particular rule 325A may exist that specifies that if a heartbeat is not received from the security system within a certain timeframe, then transition from state 310A to state 310B. In various embodiments, actions 320A-C are any of an assortment of operations to be performed by a computer system 110, including the actions listed with regards to FIG. 1. For example, state 310B may include a particular action 320B that occurs when a particular rule 325B is satisfied. Continuing with the security system example, if a heartbeat is not received for several timeframes (satisfying the particular rule 325B), then an information technology (IT) technician may be contacted per the particular action 320B. This may be followed by a transition from state 310B to state 310C.

In various embodiments, actions 320A-C and their associated rules 325A-C are distributed to computer systems 110 within network 100. Returning to the above example, instead of sending heartbeats across the entire network 100 (e.g., from system 110C to system 110A), heartbeats may be sent to a router (e.g., system 110B) that is near the security system. As such, the router may be provided with program instructions 125 that when executed cause that router to process actions 320A and 320B and their corresponding rules 325A and 325B. Thus, the router may monitor the security system for crashes and may send only crucial information across the entire network 100, saving bandwidth.

After creating an orchestration 300 and assigning its actions 320 and rules 325 to systems 110 via interface 200, a user may wish to see an overview of orchestration 300 and the statistics relating to its implementation on systems 110. Accordingly, an example of a user interface 400 for showing such information will now be discussed with respect to FIG. 4

Figure 4:
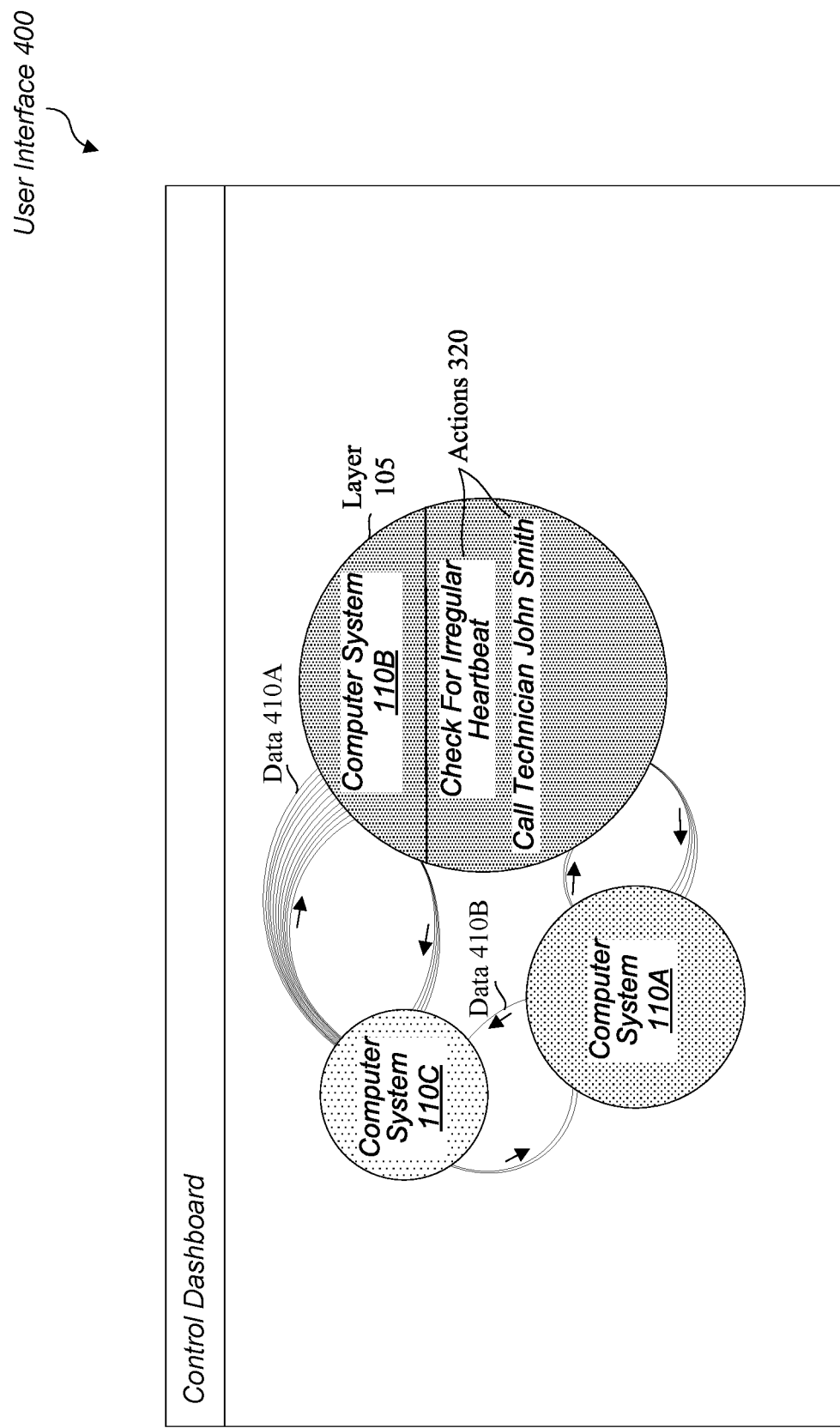
FIG. 4 is a block diagram illustrating example elements of a user interface for viewing an information flow, according to some embodiments.

Turning now to FIG. 4, a block diagram of a user interface 400 is shown. In the illustrated embodiment, user interface 400 presents information about layers 105, systems 110, and actions 320. In some cases, user interface 400 may be implemented differently than shown—e.g., user interface 400 may be combined with user interface 200.

User interface 400, in various embodiments, presents an overview of orchestration 300, including where its actions 320 are implemented. For example, as shown, a user may see that system 110B is responsible for checking for irregular heartbeats. Additionally, in some embodiments, interface 400 allows a user to redistribute actions 320 (or other parts of orchestration 300) among systems 110. In some cases, a user may simply drag actions 320 from one system 110 to another; in other cases, user interface 400 may direct the user to user interface 200. In various embodiments, interface 400 provides information about the utilization of systems 110 and the flow of data 410 between them. For example, as shown, a user may see that most of the data 410 of the orchestration flows from system 110C to system 110B—shown as data 410A—while the least amount of data 410 flows from system 110A to system 110C—shown as data 410B. This may provide further insight into how much data is flowing across the entirety of multi-layer computer network 100 (e.g., from an edge system to a core system). User interface 400 may also present historical data about systems 110 such as the availability of each system 110 (e.g., how often a system 110 crashes or has an issue).

Figure 5:
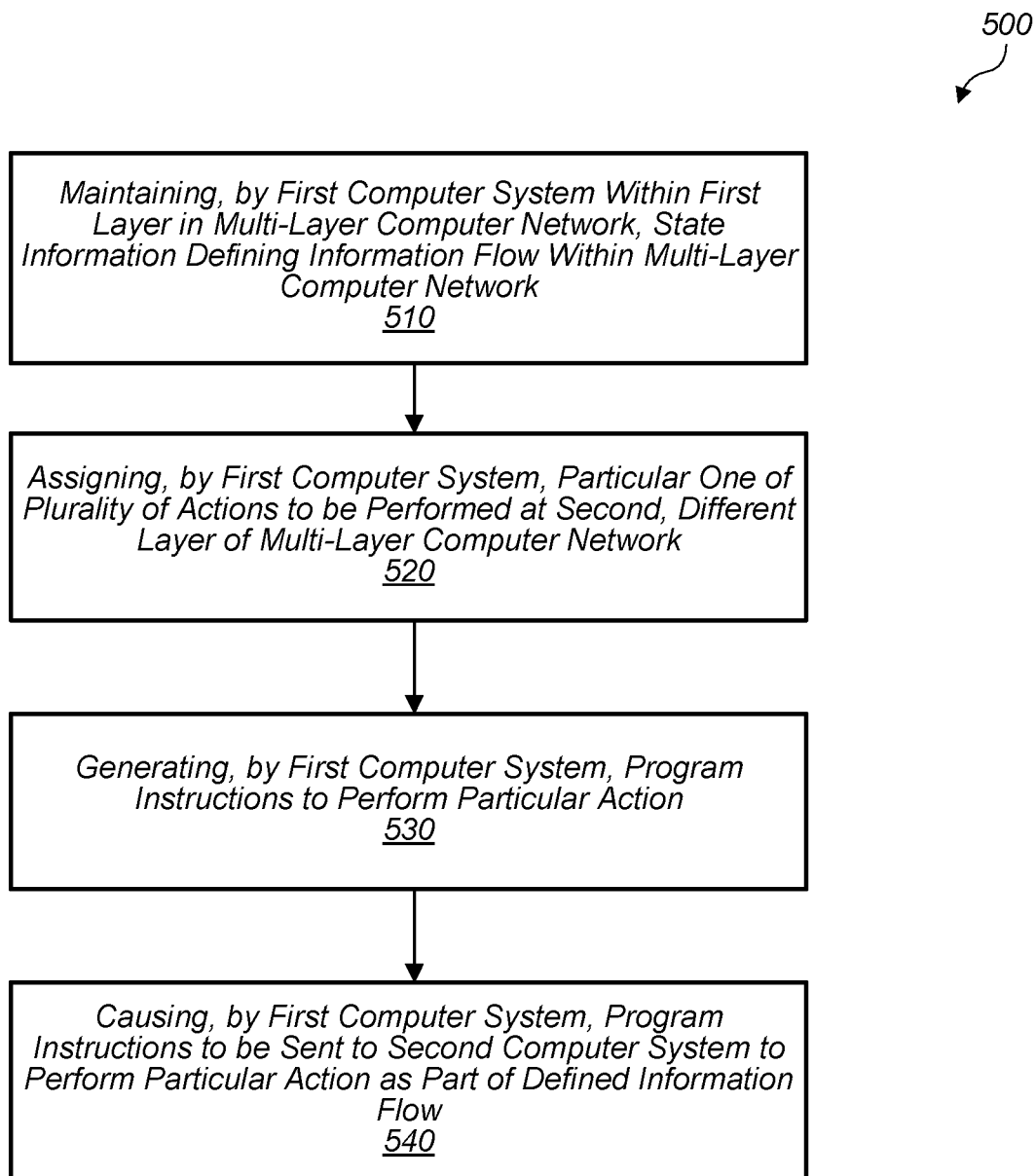
FIG. 5-7 are flow diagrams illustrating example methods for implementing an information flow in a multi-layer computer network, according to some embodiments.

Turning now to FIG. 5, a flow diagram of a method 500 is shown. Method 500 is one embodiment of a method performed by a computer system such as system 110A to implement an information flow (e.g., orchestration 300). Accordingly, when a user wishes to distribute actions (e.g., actions 320A-C) in their information flow to computer systems within a multi-layer computer network (e.g., network 100), a user may cause the computer system to perform the steps of method 500. In some embodiments, method 500 includes additional steps such as receiving an information flow from a user.

Method 500 begins in step 510 with a first computer system (e.g., system 110A) within a first layer (e.g., layer 105A) in a multi-layer computer network maintaining state information (e.g., information 127) defining an information flow within the multi-layer computer network. In some embodiments, the information flow includes a plurality of actions (e.g., actions 320A-C). In some embodiments, the information flow includes a state machine having the plurality of actions, wherein the plurality of actions are to be performed based on states (e.g., states 310A-C) of a third computer system (e.g., system 110C) within a third, different layer (e.g., layer 105C) of the multi-layer computer network.

In step 520, the first computer system assigns a particular one of the plurality of actions to be performed at a second, different layer (e.g., layer 105B) of the multi-layer computer network. In some embodiments, this assigning by the first computer system is based on a selection, provided by a user, that specifies the second computer system for performing the particular action.

In step 530, the first computer system generates program instructions (e.g., instructions 125) to perform the particular action. The program instructions may be generated using device information (e.g., information 124) accessible to the first computer system. In some embodiments, the device information indicates characteristics of a second computer system (e.g., system 110B) within the second layer. The characteristics may indicate a processing capacity and a memory capacity of the second computer system. In step 540, the first computer system cause the program instructions to be sent to the second computer system to perform the particular action as part of the defined information flow.

Figure 6:
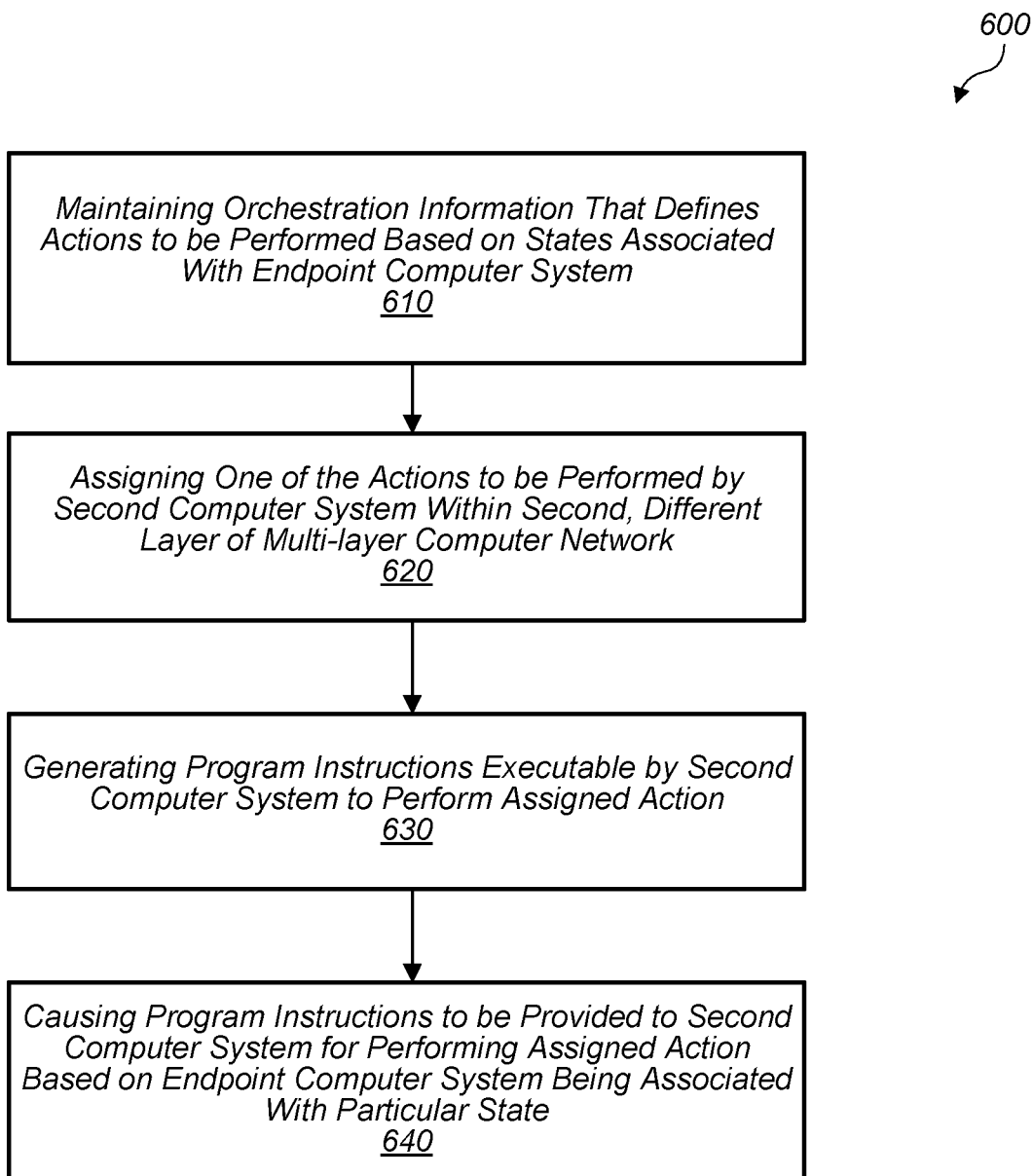

Turning now to FIG. 6, a flow diagram of a method 600 is shown. Method 600 is one embodiment of a method performed by a first computer system (e.g., system 110A) within a first layer (e.g., layer 105A) of a multi-layer computer network (e.g., network 100) to implement an information flow (e.g., orchestration 300). In some embodiments, method 600 includes additional steps such as receiving an information flow from a user.

Method 600 begins in step 610 with a first computer system maintaining orchestration information (e.g., information 127) defining actions (e.g., actions 320) to be performed based on states (e.g., states 310) associated with an endpoint computer system (e.g., system 110C). The actions may be associated with an information flow.

In step 620, the first computer system assigns one of the actions to be performed by a second computer system (e.g., system 110B) within a second, different layer (e.g., layer 105B) of the multi-layer computer network. In some embodiments, the first computer system causes a graphical user interface (e.g., user interface 200) to be displayed to a user that allows the user to assign ones of the actions to computer systems in the multi-layer computer network.

In step 630, the first computer system generates program instructions (e.g., instructions 125) executable by the second computer system to perform the assigned action. These program instructions may be generated based on device information (e.g., information 124) that specifies characteristics of the second computer system. Based on the device information, in some embodiments, the first computer system determines whether the second computer system has sufficient resources to perform the action. The assigned action may have been assigned after determining that the second computer system has the processing capacity and the memory capacity for performing the action.

In step 640, the first computer system causes the program instructions to be provided to the second computer system for performing the assigned action based on the endpoint computer system being associated with a particular state. The endpoint computer system may be within a third, different layer (e.g., layer 105C) of the multi-layer computer network. In some embodiments, the first computer system re-assigns the assigned action to a fourth computer system in a fourth, different layer of the multi-layer computer network. After re-assigning the assigned action, the first computer system may instruct the second computer system to not perform the assigned action and cause program instructions generated for the fourth computer system to be sent to the fourth computer system.

Figure 7:
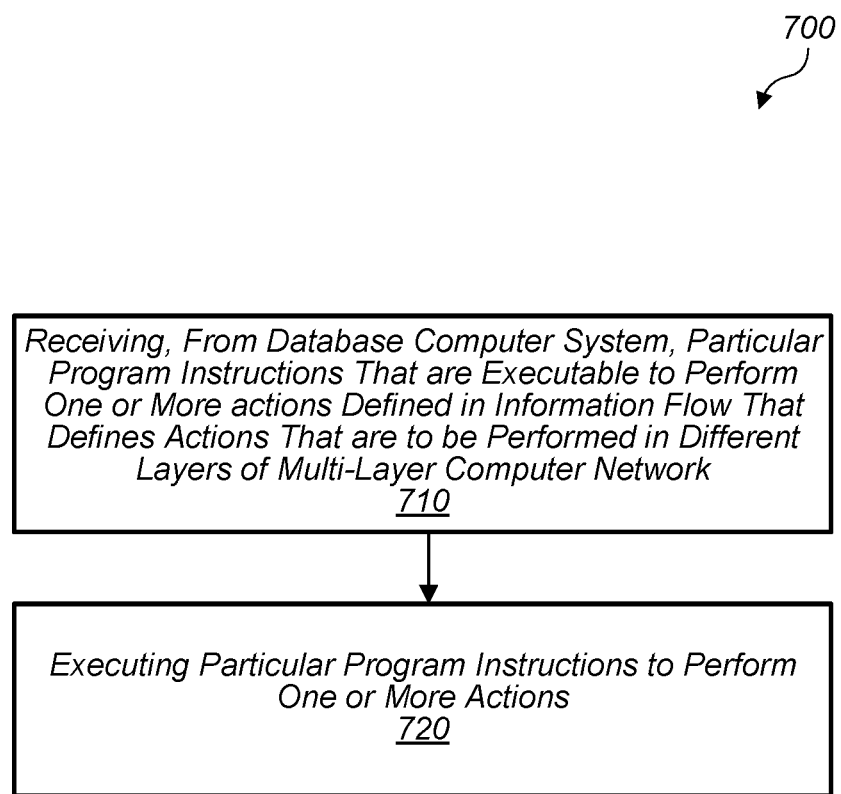

Turning now to FIG. 7, a flow diagram of a method 700 is shown. Method 700 is one embodiment of a method performed by a midpoint computer system (e.g., system 110B) to implement an information flow (e.g., orchestration 300). Method 700 may be implemented by executing program instructions residing on a non-transitory, computer-readable medium. In some embodiments, method 700 includes additional steps such as the midpoint computer system providing, to another system (e.g., system 110A), system information that specifies a processing utilization and a memory utilization of the midpoint computer system.

Method 700 begins in step 710 with a midpoint computer system receiving, from a database computer system (e.g., system 110A), particular program instructions (e.g., instructions 125) that are executable to perform one or more actions (e.g., actions 320) defined in an information flow (e.g., orchestration 300) that defines actions that are to be performed in different layers (e.g., layers 105) of a multi-layer computer network (e.g., network 100). The midpoint and database computer systems may be in different layers of the multi-layer computer network.

In step 720, the midpoint computer system executes the particular program instructions to perform the one or more actions. The one or more actions may include receiving, from an endpoint computer system (e.g., system 110C) residing in a different layer (e.g., layer 105C) of the multi-layer computer network than the midpoint and database computer systems, data indicative of the endpoint computer system being in a first state (e.g., state 310A). The one or more actions may further include determining that the endpoint computer system has transitioned from the first state to a second state (e.g., state 310B) based on an indication associated with the endpoint computer system. In some embodiments, the midpoint system derives the indication in response to not receiving the data (e.g., a heartbeat) from the endpoint computer system. The one or more actions may yet further include notifying the database computer system that the endpoint computer system has transitioned to the second state.

Figure 8:
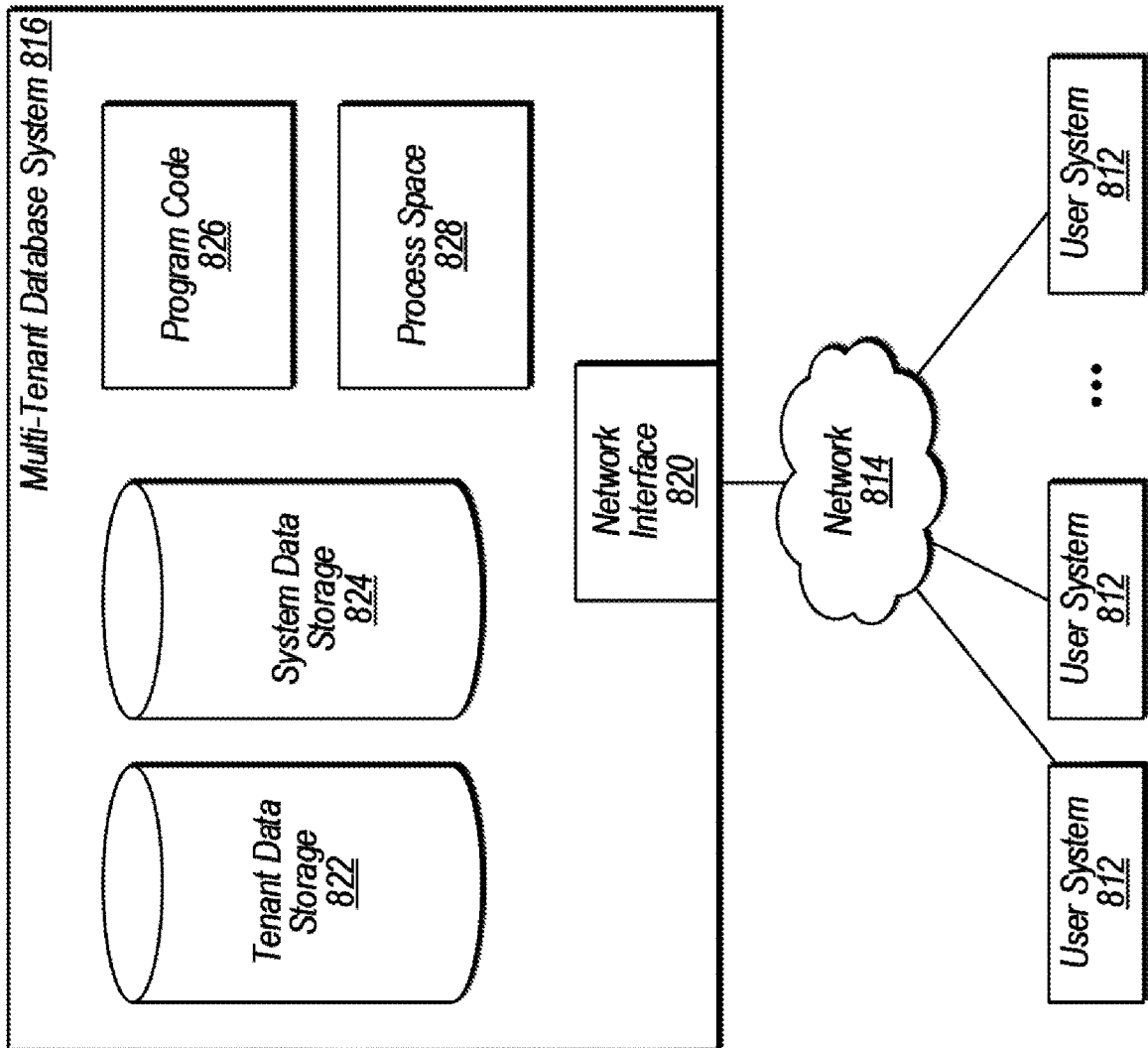
FIG. 8-9 are example environments for a multi-tenant database system, according to some embodiments.

In some embodiments, the midpoint computer system receives, from the database computer system, a command to no longer perform the one or more actions defined in the information flow. In response to receiving the command, the midpoint computer system may cease executing the program instructions received from the database computer system as part of the information flow Exemplary Multi-Tenant Database System FIG. 8 illustrates an exemplary environment in which a multi-tenant database and cache system might be implemented. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc. As illustrated in FIG. 8 (and in more detail in FIG. 9) one or more user systems 812 may interact via a network 814 with a multi-tenant database system (MTS) 816, which may be any of the systems 110. The users of those user systems 812 may be users in differing capacities and the capacity of a particular user system 812 might be determined by the current user. For example, when a salesperson is using a particular user system 812 to interact with MTS 816, that user system 812 may have the capacities allotted to that salesperson. However, while an administrator is using the same user system 812 to interact with MTS 816, it has the capacities allotted to that administrator. Accordingly, in various embodiments, information (e.g., device information 124, state information 127, etc.) maintained by a system (e.g., system 110A) implementing system 816 can be modified by only the users that have the appropriate capacities (e.g., permissions).

Network 814 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 812 may communicate with MTS 816 using TCP/IP and, at a higher network level, use other common Internet protocols to communicate, such as HTTP, FTP, AFS, WAP, etc. As an example, where HTTP is used, user system 812 might include an HTTP client commonly referred to as a "browser" for sending and receiving HTTP messages from an HTTP server at MTS 816. Such a server might be implemented as the sole network interface between MTS 816 and network 814, but other techniques might be used as well or instead. In some implementations, the interface between MTS 816 and network 814 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 8 implements a web-based customer relationship management (CRM) system. For example, in some embodiments, MTS 816 includes application servers configured to implement and execute CRM software applications as well as provide related data, code, forms, web pages and other information to and from user systems 812 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 816 is shown in FIG. 8, including a network interface 820, storage 822 for tenant data, storage 824 for system data accessible to MTS 816 and possibly multiple tenants, program code 826 for implementing various functions of MTS 816, and a process space 828 for executing MTS system processes and tenant-specific processes, such as running applications as part of an application service.

Several elements in the system shown in FIG. 8 may include conventional, well-known elements that need not be explained in detail here. For example, each user system 812 may be a desktop personal computer, workstation, laptop, PDA, cell phone, or any WAP-enabled device or any other computing device capable of interfacing directly or indirectly to the Internet or other network connection. User system 812 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 812 to access, process, and view information and pages available to it from MTS 816 over network 814. Each user system 812 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 816 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 812 and its components are operator configurable using applications, such as a browser, that include computer code executable on one or more processing elements. Similarly, in some embodiments, MTS 816 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 816 is configured to provide web pages, forms, applications, data, and/or media content to user systems 812 to support the access by user systems 812 as tenants of MTS 816. As such, in this embodiment, MTS 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline back-ups or other redundancies, etc., and might include a distributed database or storage network and associated processing intelligence.

Figure 9:
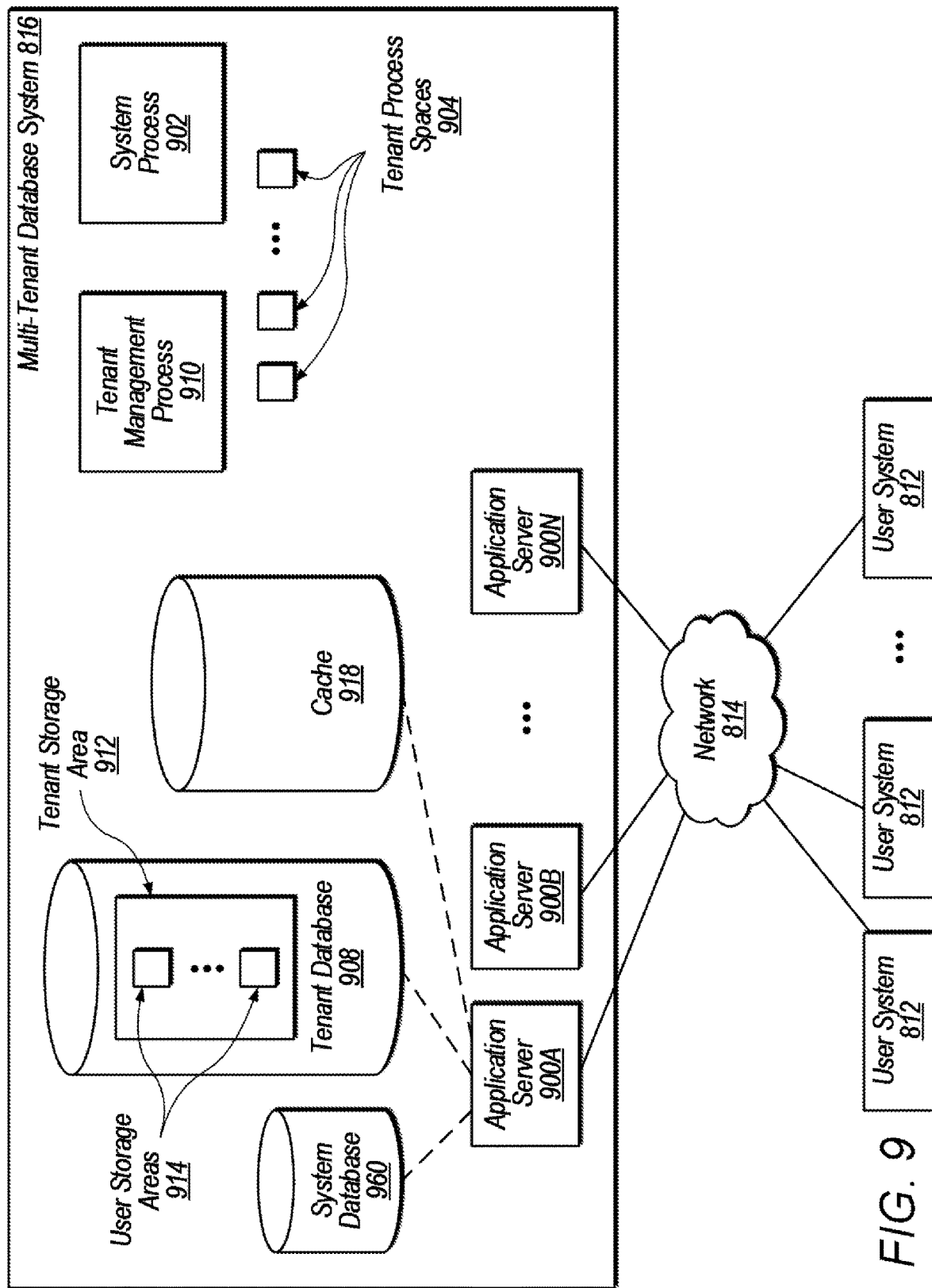

FIG. 9 illustrates exemplary embodiments of an MTS 816 and various interconnections in more detail. In this example, the network interface is implemented as one or more HTTP application servers 900. Also shown is system process space 902 including individual tenant process spaces 904, a system database 906, tenant database(s) 908 and a tenant management process space 910. Tenant database 908 may be shared across application servers and may be divided into individual tenant storage areas 912, which can be either a physical arrangement or a logical arrangement. Within each tenant storage area 912, user storage 914 might be allocated for each user.

In the illustrated embodiment, each application server 900 also includes at least a portion of a cache 918. In some embodiments, user systems 812 that utilize web applications can request that data be stored in cache 918 (e.g., using a "put" operation) and later retrieve the data (e.g., using a "get" operation) rather than re-generating the data. In some embodiments, capacity limits may be assigned to different users/tenants/partitions, etc. and cached data may be evicted in order to remain below the allotted capacity. In some embodiments, cached data for a particular tenant is kept private from other tenants. Further, the visibility scope for cached data within a particular tenant may be configurable.

In some embodiments, cache 918 is split across multiple application servers 900. In some embodiments, splitting across multiple instances may allow the data in cache 918 to fit in system memory space, which may improve response times relative to storing data for cache 918 in disk storage, for example. As used herein, an "in-memory cache" is a cache that stores data in system memory space (which typically means that the data can be stored in RAM) rather than requiring paging for storage (as is typically required for traditional disc storage, for example). Cache 918 may also be a "multi-tenant" cache in the sense that a single cache is used to provide separate virtual caches for multiple different tenant entities. The different tenants may use the same data structure to store data or different tenants may have different data structures in the cache. In various embodiments, multi-tenant caches enforce data security between tenants such that data from one tenant is not available to other tenants. Thus, as used herein, the term "tenant" in the context of a multi-tenant cache refers to an entity for which cache entries are separately maintained such that different tenants cannot access each other's data. In some embodiments, tenants may authorize other tenants to access their data via the cache, while in other embodiments a given tenant's data may be accessible to only that tenant via the multi-tenant cache (although that tenant may subsequently share data retrieved from the cache, as that tenant desires).

It should also be understood that each application server 900 may be communicably coupled to database systems, e.g., system database 906 and tenant database(s) 908, via, a different network connection. For example, one server $900_1$ might be coupled via network 814, another server $900_{N-1}$ might be coupled via a direct network link, and another server $900_N$ might be coupled by yet a different network connection. Transfer Control Protocol and Internet Protocol (TCP/IP) are preferred protocols for communicating between servers 900 and the database system, however, it will be apparent to one skilled in the art that other transport protocols may be used to optimize the system depending on the network interconnect used.

In preferred aspects, each application server 900 is configured to handle requests for any user/organization. Because it is desirable to be able to add and remove application servers from the server pool at any time for any reason, there is preferably no server affinity for a user and/or organization to a specific application server 900. In one embodiment, therefore, an interface system (not shown) implementing a load balancing function (e.g., an F5 Big-IP load balancer) is communicably coupled between the servers 900 and the user systems 812 to distribute requests to the servers 900. In one aspect, the load balancer uses a least connections algorithm to route user requests to the servers 900. Other examples of load balancing algorithms, such as are round robin and observed response time, also can be used. For example, in certain aspects, three consecutive requests from the same user could hit three different servers, and three requests from different users could hit the same server. In this manner, MTS 816 is multi-tenant, wherein the MTS 816 handles storage of different objects and data across disparate users and organizations.

As an example of storage, one tenant might be a company that employs a sales force where each salesperson uses MTS 816 to manage their sales process. Thus, a user might maintain contact data, leads data customer follow-up data, performance data, goals and progress data, all applicable to that user's personal sales process (e.g., in tenant database 908). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 816 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 816 might also maintain system level data usable by multiple tenants. Such system level data might include industry reports, news, postings, and the like that are sharable among tenants.

In certain aspects, client systems 812 communicate with application servers 900 to request and update system-level and tenant-level data from MTS 816 that may require one or more queries to database system 906 and/or database system 908. In some embodiments, MTS 816 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Figure 10:
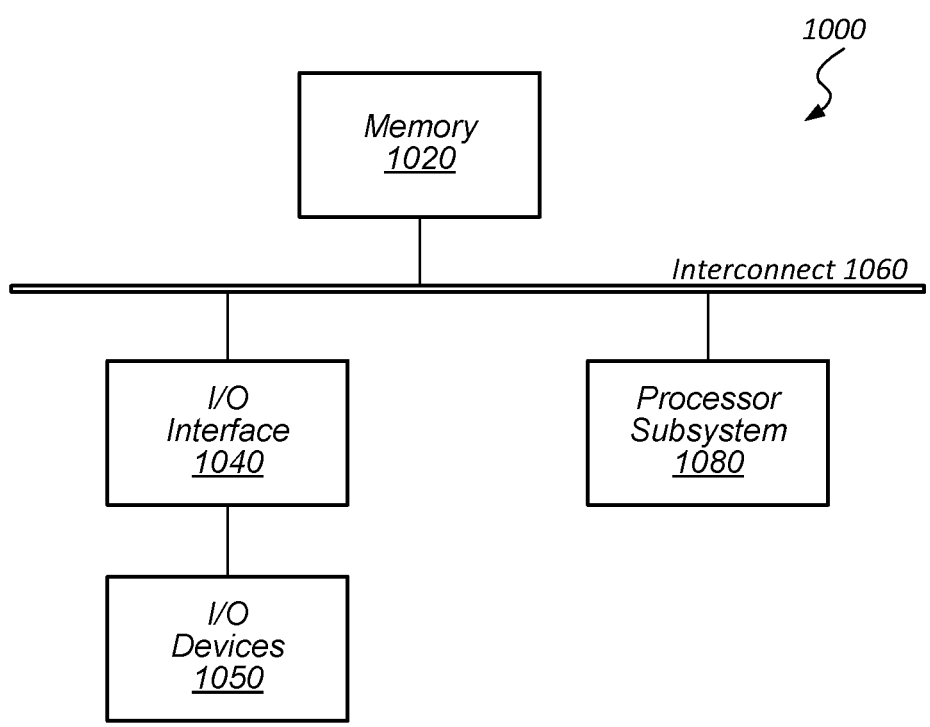
FIG. 10 is a block diagram illustrating an example computer system, according to some embodiments.

Turning now to FIG. 10, a block diagram of an exemplary computer system 1000, which may implement systems 110, is depicted. Computer system 1000 may be representative of a computer system at any of layers 105. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080. In various embodiments, device information 124, state information 127, intelligence module 130, and contextual information 140 described above may be included within system memory 1020.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   maintaining, by a first computer system in a first layer of a multi-layer computer network, state information defining an information flow within the multi-layer computer network, wherein the information flow includes a plurality of actions, one of which is assigned to a second, different computer system in a second layer of the multi-layer computer network and is to be performed based on a state of a specified computer system in a third layer of the multi-layer computer network;
   receiving, by the first computer system, a request to update the information flow such that the action is re-assigned to a third, different computer system that is not located in the first and third layers; and
   in response to receiving the request, the first computer system:
      causing the second computer system to no longer perform the action;
      generating program instructions that are executable by the third computer system to perform the action based on the state of the specified computer system in the third layer; and
      causing the program instructions to be sent to the third computer system.

2. The method of claim 1, further comprising:
   prior to generating the program instructions that are executable to perform the action, the first computer system determining whether the third computer system is capable of performing the action based on a processing capacity of the third computer system.

3. The method of claim 1, further comprising:
   causing, by the first computer system, a user interface to be displayed to a user via a user device, wherein the user interface presents a plurality of settings that are configurable by the user, and wherein the plurality of settings include:
      a first setting configurable to define a computer system in the multi-layer computer network for performing the action; and
   wherein the request to update the information flow is received via the user interface.

4. The method of claim 3, wherein the plurality of settings include:
   a second setting that is configurable to define a condition that upon satisfaction, the action is performed, wherein the request to update the information flow indicates a particular condition for the action.

5. The method of claim 1, further comprising:
   receiving, by the first computer system, information indicative of a resource utilization of the third computer system;
   in response to determining that the resource utilization does not satisfy a threshold resource usage amount, the first computer system:
      assigning an additional one of the plurality of actions to be performed by the third computer system; and
      causing additional program instructions to be sent to the third computer system that are executable to perform the additional action.

6. The method of claim 1, wherein the state information includes a state machine that defines a plurality of states representative of the information flow, and wherein performance of the action causes a state transition from a first state to a second state of the state machine.

7. The method of claim 1, wherein the program instructions are generated based on device information that indicates an operating system executing on the third computer system.

8. The method of claim 1, wherein the third computer system is within a different layer of the multi-layer computer network than the second computer system.

9. The method of claim 1, wherein the first layer includes a cloud platform having the first computer system, the second layer includes a gateway system having the third computer system, and the third layer includes an endpoint system having the specified computer system.

10. A non-transitory, computer-readable medium having program instructions stored thereon that are capable of causing a first computer system within a first layer of a multi-layer computer network to perform operations comprising:
    maintaining state information defining an information flow within the multi-layer computer network, wherein the information flow includes a plurality of actions, one of which is assigned to a second, different computer system in a second layer of the multi-layer computer network and is to be performed based on a state of a specified computer system in a third layer of the multi-layer computer network;
    making a determination to modify the information flow such that the action is re-assigned to a third, different computer system that is not located in the first and third layers; and
    in response to making the determination to modify the information flow:
       causing the second computer system to no longer perform the action;
       generating program instructions that are executable by the third computer system to perform the action based on the state of the specified computer system in the third layer; and
       causing the program instructions to be sent to the third computer system.

11. The medium of claim 10, wherein the operations further comprise:
    performing comparisons between resource utilization values of a plurality of computer systems of the multi-layer computer network and a threshold resource utilization value, wherein the plurality of computer systems includes the second and third computer systems, and wherein the determination to modify the information flow is made based on the comparisons.

12. The medium of claim 10, wherein the operations further comprise:
    causing a user interface to be displayed to a user via a user device that presents one or more suggested computer systems in the multi-layered computer network for which to assign the action, wherein the determination to modify the information flow is made based on a selection involving the one or more suggested computer systems.

13. The medium of claim 10, wherein the operations further comprise:
    accessing device information for the third computer system that identifies a processing and memory capacity of the third computer system, wherein the program instructions are generated based on the accessed device information.

14. The medium of claim 13, wherein the operations further comprise:

prior to generating the program instructions, determining, based on the device information, whether the processing and memory capacity of the third computer system satisfies a threshold capacity for performing the action.

15. The medium of claim 10, wherein the operations further comprise:

providing, to the third computer system, contextual information that defines a contact that is usable to notify an entity, wherein the action involves notifying the entity in response to the specified computer system reaching a particular operational state.

16. A non-transitory, computer-readable medium having program instructions stored thereon that are capable of causing a midpoint computer system to perform operations comprising:

receiving, from a cloud-based computer system of a cloud platform, program instructions that are executable to perform a plurality of actions defined in an information flow that defines actions that are to be performed in different layers of a multi-layer computer network, wherein the midpoint computer system resides in a first layer and the cloud-based computer system resides in a second layer of the multi-layer computer network, wherein at least one of the plurality of actions is to be performed based on a state of an endpoint computer system in a third layer of the multi-layer computer network;

causing execution of the program instructions to perform the plurality of actions;

receiving, from the cloud-based computer system, a command to no longer perform the plurality of actions defined in the information flow; and in response to receiving the command, ceasing execution of the program instructions received from the cloud-based computer system as part of the information flow.

17. The medium of claim 16, wherein the operations further comprise:

sending, to the cloud-based computer system, system information identifying a processing utilization and a memory utilization, wherein the cloud-based computer system is configured to determine whether to assign one or more additional actions to the midpoint computer system based on the system information.

18. The medium of claim 16, wherein the plurality of actions include:

determining that the endpoint computer system has transitioned from a first state to a second state; and sending, to the cloud-based computer system, a notification that indicates that the endpoint computer system has transitioned to the second state.

19. The medium of claim 16, wherein the operations further comprise:

receiving, from the cloud-based computer system, additional program instructions that are executable to perform at least one additional action.

* * * * *